United States Patent
Queenan et al.

(10) Patent No.: US 8,493,630 B2
(45) Date of Patent: Jul. 23, 2013

(54) IDENTIFICATION READER

(75) Inventors: James R. Queenan, Litchfield, NH (US); John P. Sanroma, Billerica, MA (US); Mohamed Lazzouni, Northborough, MA (US)

(73) Assignee: L-I Indentity Solutions, Inc., Stamford, CT (US)

( * ) Notice: Subject to any disclaimer, the term of this patent is extended or adjusted under 35 U.S.C. 154(b) by 1446 days.

(21) Appl. No.: 12/118,009

(22) Filed: May 9, 2008

(65) Prior Publication Data

US 2008/0304111 A1  Dec. 11, 2008

Related U.S. Application Data

(60) Provisional application No. 60/928,825, filed on May 10, 2007.

(51) Int. Cl.
*H04N 1/04* (2006.01)

(52) U.S. Cl.
USPC ........... 358/302; 358/474; 358/486; 358/497; 358/498; 399/125; 399/195

(58) Field of Classification Search
USPC .......... 358/302, 474, 486, 497, 498; 399/125, 399/195
See application file for complete search history.

(56) References Cited

U.S. PATENT DOCUMENTS

| | | | | |
|---|---|---|---|---|
| 3,661,452 A | * | 5/1972 | Hewes et al. | 399/195 |
| 4,403,851 A | * | 9/1983 | Yanagawa | 399/125 |
| 5,915,691 A | * | 6/1999 | Deguchi et al. | 271/265.01 |
| 6,678,977 B1 | * | 1/2004 | Sherman | 40/341 |
| 7,495,809 B2 | * | 2/2009 | Sheng et al. | 358/474 |
| 2005/0241092 A1 | * | 11/2005 | Takesawa et al. | 15/179 |
| 2007/0181664 A1 | * | 8/2007 | Hatzav et al. | 235/375 |
| 2008/0037076 A1 | * | 2/2008 | Ohama et al. | 358/498 |

FOREIGN PATENT DOCUMENTS

SE  9001644 A  * 11/1991

* cited by examiner

Primary Examiner — King Poon
Assistant Examiner — Allen H Nguyen
(74) Attorney, Agent, or Firm — Fish & Richardson P.C.

(57) ABSTRACT

A passport and identification card reader minimizes the time and effort required for an operator to read/scan a passport or piece of identification. An immigration official, for example, can slide a passport into place with one hand while tending to other important security activities with the other hand. Once in place, the passport will be automatically detected and read. Numerous passports bound together by a traveler with multiple visas can be held flat in place and accurately read, even with one hand, despite the natural tendency of the passport(s) to return to a closed position.

14 Claims, 12 Drawing Sheets

IDENTIFICATION READER

CROSS-REFERENCE TO RELATED APPLICATIONS

This application claims the benefit of U.S. Provisional Patent Application No. 60/928,825, filed May 10, 2007 entitled "IA-Thenticate Repackage Design" to James R. Queenan, John P. Sanroma and Mohamed Lazzouni, which is hereby incorporated in its entirety by reference as if fully set forth herein.

BACKGROUND OF THE INVENTION

The present invention relates to the reading of identification documents, including passports.

Facilitating prompt passenger clearance is the most fundamental mandate of all border service/security agencies. Increased world-wide traveler flow and tightening security mandates has made this exercise quite challenging. Border service agencies are increasingly examining the border crossing work-flow models in order to make these processes more efficient. The introduction of the e-passport, however, has exacerbated traditional work flow models. Whereas traditional passport reading is accomplished in 2-3 seconds, many of the latest e-passports can take as long as 10 seconds to process.

SUMMARY OF THE INVENTION

A passport and identification card reader minimizes the time and effort required for an operator to read/scan a passport or piece of identification. A border service/security agent, for example, can slide the passport into place with one hand while tending to other important security activities with the other hand. Once in place the passport will be automatically detected and read. Numerous passports bound together by a traveler with multiple visas can be held flat in place and accurately read, even with one hand, despite the natural tendency of the passport(s) to return to a closed position.

One aspect of the invention relates to a passport reader that comprises: a body comprising a digital image capture mechanism and a platen located above the digital image capture mechanism; a fixed positioning device atop the body; the fixed positioning device having a outer surface and an inner surface and an opening for receiving a passport; and a plurality of brushes affixed to the inner surface and extending down towards the platen; the plurality of the brushes operable to hold a page of the passport against the platen such that an operator of the reader need use only one hand to place the passport within the opening, have the passport read, and remove the passport.

Another aspect of the invention relates to a method of operating an identification reader. The method comprises transmitting an infrared signal from an infrared emitter over a path to an infrared sensor; placing a piece of identification in the reader thereby blocking the path from the infrared emitter to the infrared sensor; detecting the presence of the identification in the reader by: performing an initial detection by sampling data from a digital image capture mechanism of the reader; verifying the initial detection by monitoring the infrared sensor, wherein if the infrared sensor does not detect an infrared signal above a threshold level, the initial detection is verified; and capturing an image of the identification with the digital image capture sensor of the reader.

Yet another aspect of the invention relates to a method of operating an identification reader. The method comprises transmitting an infrared signal from an infrared emitter over a path to an infrared sensor; placing a piece of identification in the reader thereby blocking the path from the infrared emitter to the infrared sensor; detecting the presence of the identification in the reader by: performing an initial detection by sampling data from a digital image capture mechanism of the reader; verifying the initial detection by monitoring the infrared sensor, wherein if the infrared sensor does not detect an infrared signal above a threshold level, the initial detection is verified; and capturing an image of the identification with the digital image capture sensor of the reader.

DETAILED DESCRIPTION

Figure 1:
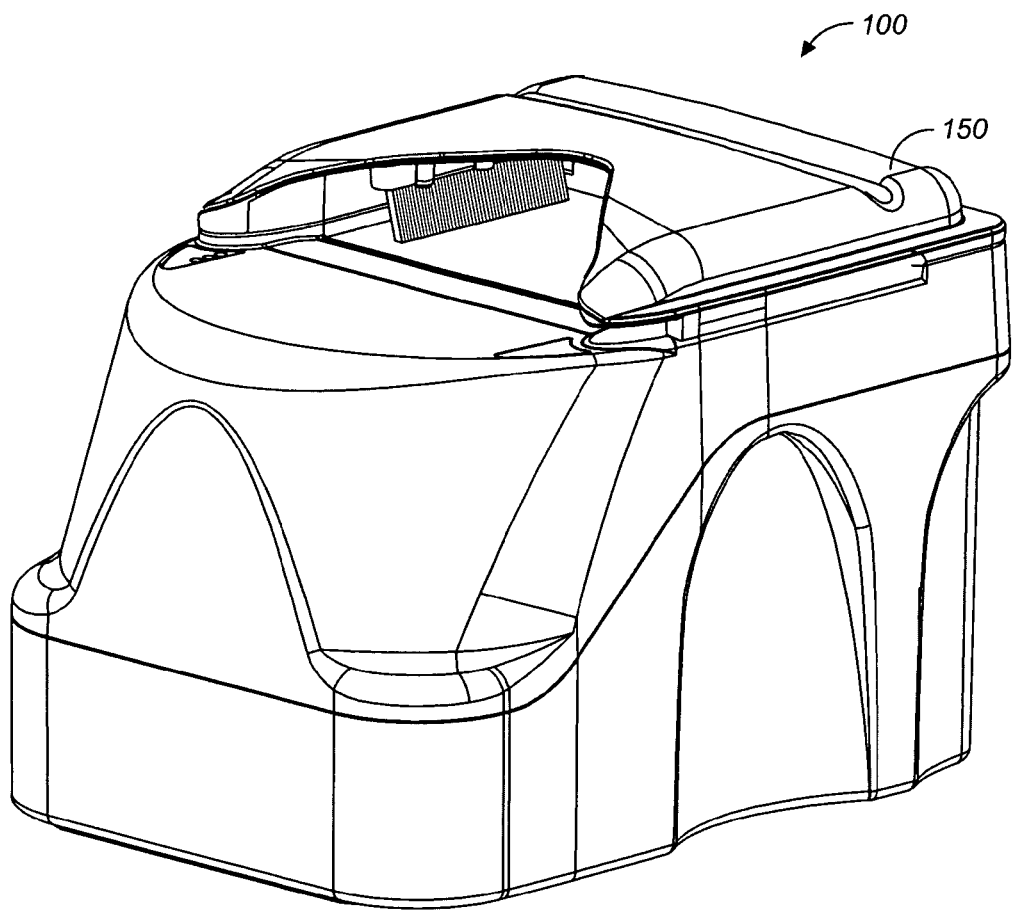
FIG. 1 illustrates a perspective view of reader 100.
Figure 2:
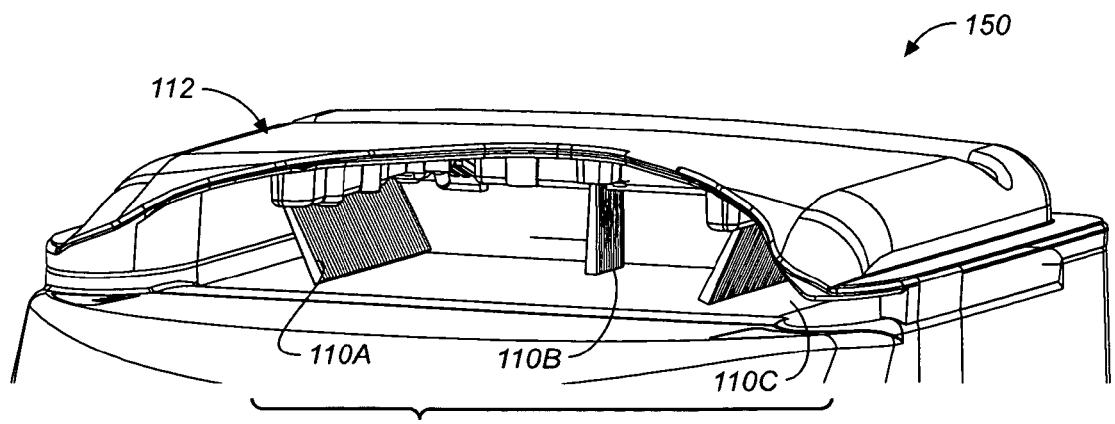
FIG. 2 illustrates a perspective view of the document holder 150 and brushes of reader 100.
Figure 3:
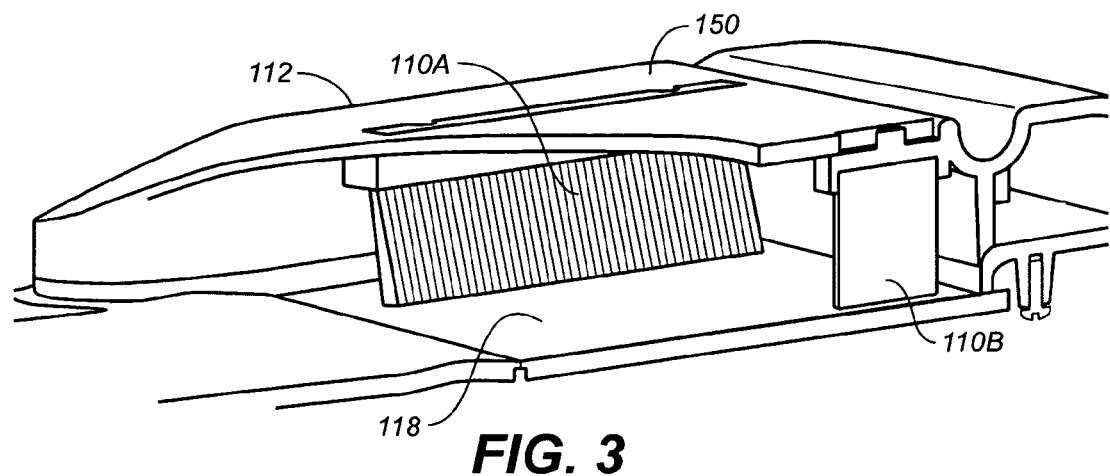
FIG. 3 illustrates a perspective view of a portion of document holder 150 and reader 100.

As mentioned in the background, facilitating prompt passenger clearance is the most fundamental mandate of all border service/security agencies. Increased world-wide traveler flow and tightening security mandates has made this exercise quite challenging. Border service agencies are increasingly examining the border crossing work-flow models in order to make these processes more efficient. The introduction of the e-passport, however, has exacerbated traditional work flow models. Whereas traditional passport reading is accomplished in 2-3 seconds, many of the latest e-passports can take as long as 10 seconds to process. Where it was formerly acceptable for agents to hold a document in place, it is now considered an excessive burden of the agent's time for this task. It is generally felt that that time could be better served by freeing up agents hands to perform other passenger clearance tasks.

Embodiments of the present invention therefore provide for hands-free operation. In other words, once the passport or other ID is inserted, the scan will automatically take place. The user does not need to hold the passport or ID in place, or press any buttons to commence the scan.

Successful hands-free design in a passport reader requires document placement guidance and the securing of travel documents ensuring read accuracy while operators are no longer in possession/control of the document. Existing solutions are not favorably regarded by customers as they have impeded operator usage and have failed to facilitate insertion guidance over the range of expected documents.

As seen in FIGS. 1-6 illustrating document reader 100, document insertion occurs along insertion path 130 (FIG. 4) by passing a document across an upper surface or shelf 116 of the reader to a glass document scanning area, sometimes referred to as a platen 118. The document insertion process is completed when the document comes to rest against a backstop and side-stop which provide a consistent placement and alignment guide for the document.

Prior designs for holding a document implement hard mechanical bodies to ensure a document is coerced flat to the imaging surface. These structures are observed to interfere with an operator's hands or require manipulations by the user. During the reading process, document placement is critical and must not be disrupted during the scanning process. Thus, a user must be able to insert a document and remove his/her hand without relocating or dislodging the document. The document should be held substantially flat against the surface 118 as failure to do so will result in poorly focused imagery and yield performance failures. As the surface 118 also represents a reference plane for an RFID antenna/transmitter relationship between the reader and document (smartchip), placement in near proximity to the antenna is required to ensure successful data transfer.

The user experience during this process ensures a simple yet consistent manner for reading documents. As many users must repetitively use the system, reader 100 does not impose discomfort or resistance to their exertions, as will be described below. Some examples of the document characteristics accommodated by reader 100 are described below.

1) Passport size—World-wide production of passports yields many different styles and types of documents. Type variations alter the manner of document insertion. Reader 100 accommodates such variations which include: rigid plastic card type document stock, flimsy thin-paper style document stock, and size variants from 4.9-6.0 inch document widths and approximately 4 inches in height. The maximum opening width is 6.0 inches and the maximum opening height is 0.61 inches.

2) ID size—Identity documents come is many shapes and sizes. The most common ID (such as a driver's license in the U.S.) is a rigid card stock with 3⅜ inches width and 2⅛ inches in height. Such an ID can also be read by the reader 100.

3) Passport construction—Some passports possess binding designs whereby there insistence on remaining closed acts against the user's exertions to insert the document. The passport's natural tendency is to not remain flat in the proper reading position. A successful design requires holding a document in place while a user is no longer engaged with the document 4) Worn documents—The characteristics and rigidity of a worn document can vary depending on document construction material. Of particular note is the soft bound passport style that tends to curl or warp across the document surface. Successful hands free design must make concessions to coerce these deformations into proper reading position.

5) Multi-bound documents—It is not uncommon for a certain percentage of travelers to maintain and use 2 or 3 outdated passports. This behavior is necessary for travelers where expired passports contain non-expired visas. There is a tendency among such travelers to either staple or use rubber bands to bind several documents together. Asking them to separate the documents during the border clearance stage would introduce delays in the work flow model. Thus, accommodating booklet thicknesses 2-3 times the normal passport thickness is desired and is a feature of the embodiments of the present invention.

The hands-free design of reader 100 also accounts for varying body types of users. These traits include: hand thickness, hand length, or height (angle of insertion). It is also common for some users to wear jewelry, such as large rings. The nominal distance between the top of the platen and the lower surface of a light shield 112 is approximately one inch but may vary from about 0.8 to 1.2 inches in the central portion of the platen, which should accommodate the vast majority of commonly worn jewelry, while still sufficiently shielding from ambient light. The hands-free design does not impinge on the operator's ability to wear jewelry. The design allows the operator to complete the document reading processing using a single hand.

The document reader 100 is an image capture device using, in a preferred embodiment, at least one light source during the reading process. Note that certain embodiments may employ multiply light sources of the same of varying type (e.g. infrared or invisible light). In order to preserve optimal performance of the reader, it is important that external/ambient light be prevented from entering the imaging area. Embodiments disclosed herein incorporate shield 112 that blocks such external light.

The preferred embodiment of document reader 100 shown in the figures employs the use of brushes 110 (or other soft membrane substrates such as elastomers) in order to coerce a document flat to the document surface or platen 118. Note that more or less brushes may be used in other embodiments. In reader 100, three brushes 110A, 110B, and 110C are incorporated into an upper housing of fixed document positioning device 150, which serves a dual purpose as an ambient light shield. Document positioning device 150, is fixed, which is to say it does not need to be moved by a user to hold a document into place, as, for example is necessary in flatbed scanners where a hinged cover must be rotated into place to hold a document flat against the scanner platen so that it can be properly imaged.

As can be seen, in the preferred embodiment of reader 100, three brushes are utilized. Central brush 110B is considerably shorter than side brushes 110A and 110C. Central brush 110B is approximately one inch or less, and is preferably 0.7 inches in length whereas side brushes 110A and 110C are approximately two to three inches in length, and preferably about 2.8 inches in length. Central brush 110A is as at the apex of cutout 112C (FIG. 4) of light shield 112. Cutout 112C, and in general the shape of light shield 112, allows a user to enter his/her hand into the fixed positioning device 150 in an area over the platen 118 in order to slide the material to be read into the proper position. The comparatively shorter length of central brush 110B also provides less resistance to insertion at the central portion of document/platen.

The length, orientation, and height of the brushes have been optimized to provide the following:

a) All brush bristle heights are optimized to provide mild engagement resistance for normal/common passports.

b) Side brushes 110A and 110C are oriented off-axis (slanted) in order to minimize pinching force that occurs as a bristle sweeps through its at-rest (straight) position.

c) Side brush length (the direction of document travel) is optimized to provide retention force from leading edge of passport toward the binding of the passport. The force applied in this design combats passport binding retention, which causes the passport to spring up off the surface to its normal closed position.

d) Brush height (bristle length) of about 0.74-0.78 (preferably 0.0.75) inches in the preferred embodiment provides sufficient stroke length to accommodate up to four multi-bound passports. Note that this may vary depending on the type of passport and may be less in certain embodiments designed to accommodate a lesser number of passports. The brush height (bristle length) is the same for both the center and side angled brushes.

e) Center brush orientation and length have been optimized to provide intentional document retention to combat outward directional force introduced by binding retention. As a document attempts to close, the wedge geometry acts to retract the document from the fully inserted position.

Central brush 110B is oriented at an angle substantially perpendicular to the surface of platen 118, whereas side brushes 110A and 110C are preferably oriented at an angle other than perpendicular to the platen and the document page of interest. In the preferred embodiments, the side brushes 110 A and 110C are oriented at about 24 to 26 degrees from vertical. The cant of the brushes may be oriented towards or away form the outside edges of the document and platen. The side brushes can therefore deflect to a greater degree than if the bristles were oriented perpendicularly to the platen. The brushes are spaced approximately 3.8 inches apart from each other. This provides: a) Displacement area for engaged brush; b) Unimpeded location for hand/finger insertion; and c) Document retention along the left and right document edges to combat document curl, and center brush location to combat document bowing.

Figure 4:
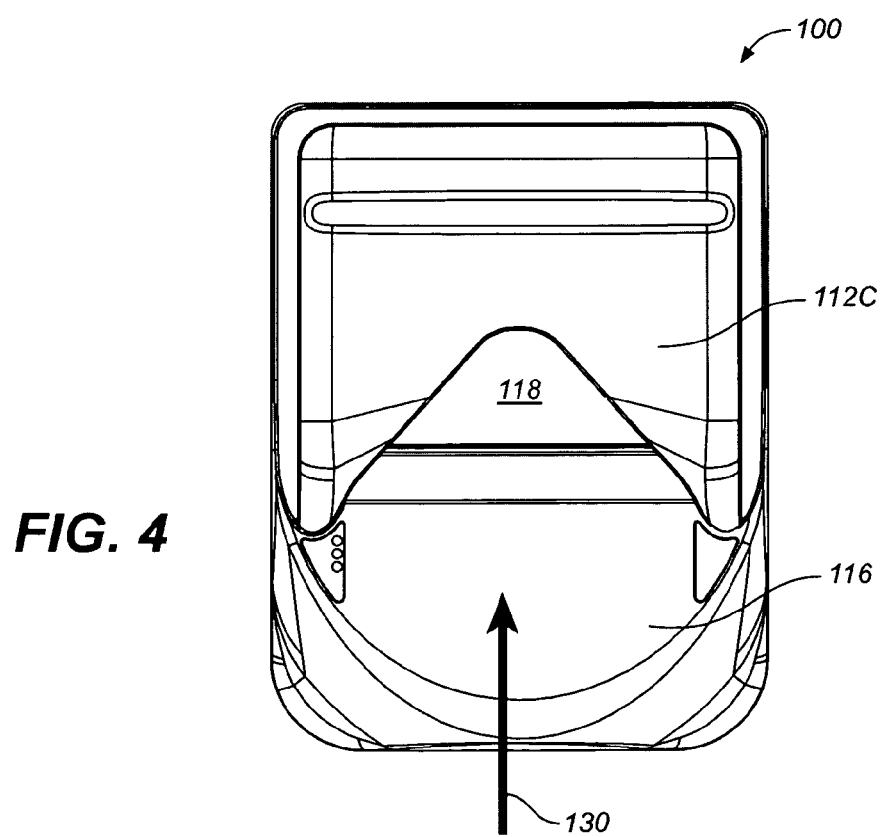
FIG. 4 illustrates a plan view of reader 100.
Figure 5A:
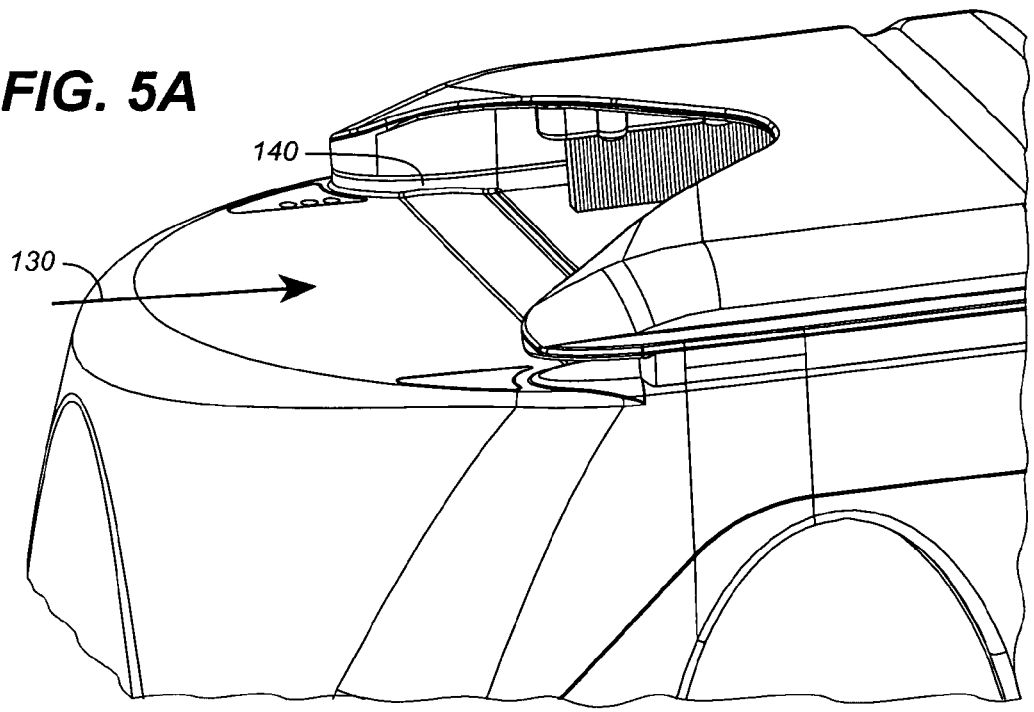
FIGS. 5A and 5B are enlarged views of document holder 150 and reader 100.
Figure 5B:
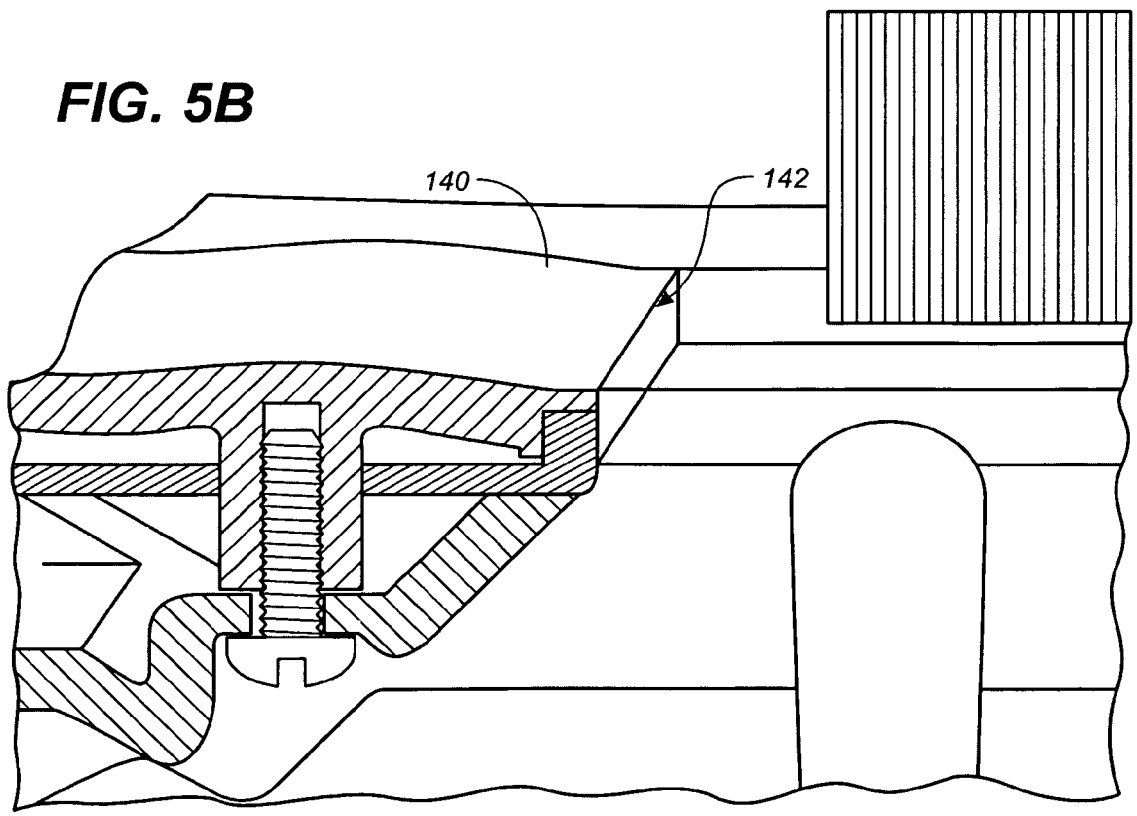

As mentioned above, reader 100 incorporates a clear window as part of the platen 118, which is preferably made of glass but may be made of any transparent material. A document is slid onto the window in a sweeping motion along document insertion path 130. The body of reader 100 is polymeric and the junction or seam between the body and the window is a potential location where documents may get snagged as they are slid onto or off of the window. As seen in FIGS. 4, 5A and 5B, an upper shelf 116 of the body of reader 100 incorporates a document insertion deflection structure 140. Deflection structure 140 is preferably an arcuate or rounded structure with a gradual transition from the leading and trailing edges to the highest portion. This avoids catching a document on the leading edge on the way to the platen and on the trailing edge on the way off of the platen. As a document passes over the document insertion deflection structure, it is raised over window/body seam 142. Additionally, the upper shelf features a beveled or rounded edge at the seam so that when identification cards (that fit entirely on the platen) are removed they do not snag on the seam.

Reader 100 is operable to read electronic or "smart" passports in accordance with ISO14443 and comprises an RFID antenna/transmitter, as described in the ISO standard, hereby incorporated by reference in the entirety.

Document Detection Sensor

Figure 6A:
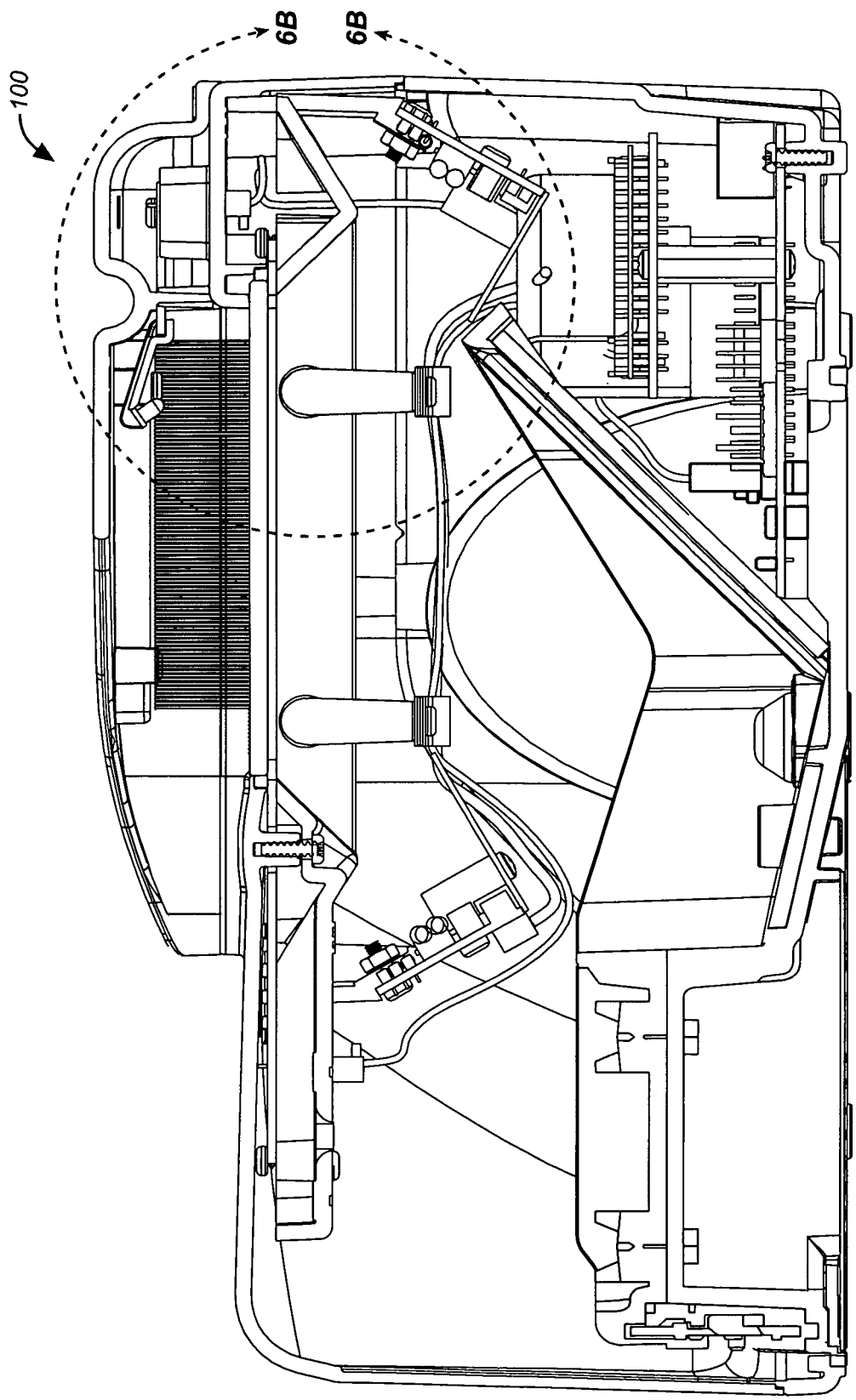
FIG. 6A is a section of reader 100.
Figure 6B:
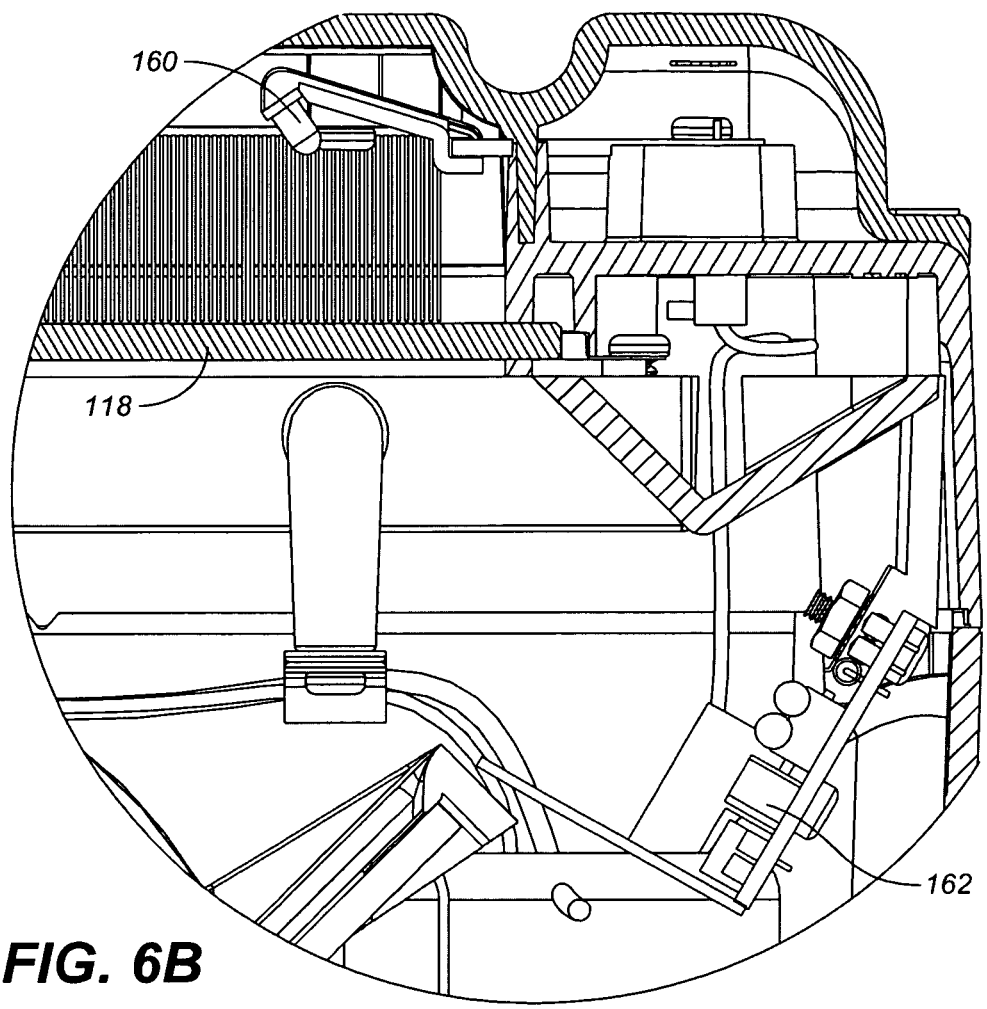
FIG. 6B is a section of area E shown in FIG. 6A.
Figure 6C:
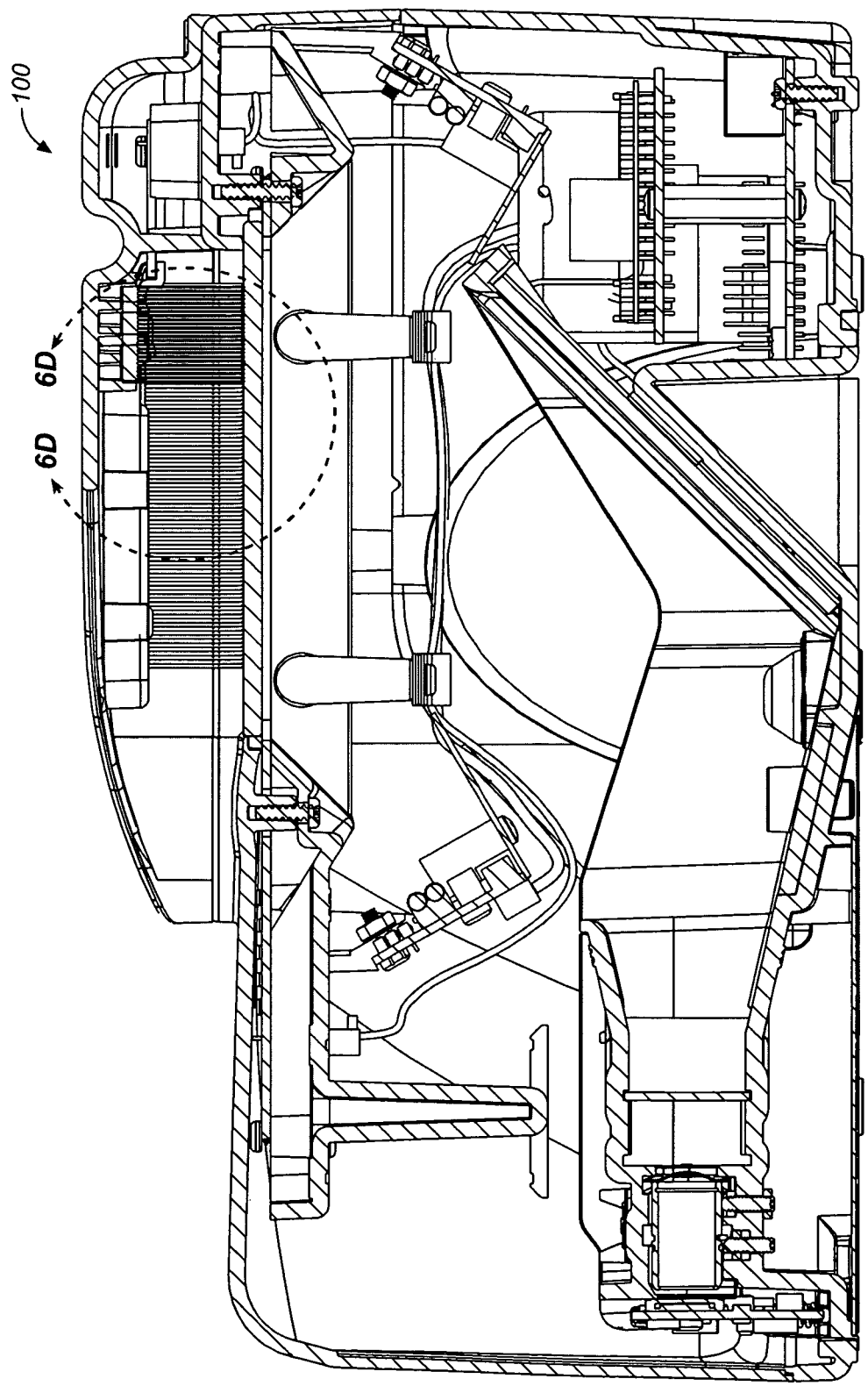
FIG. 6C is another section of reader 100.
Figure 6D:
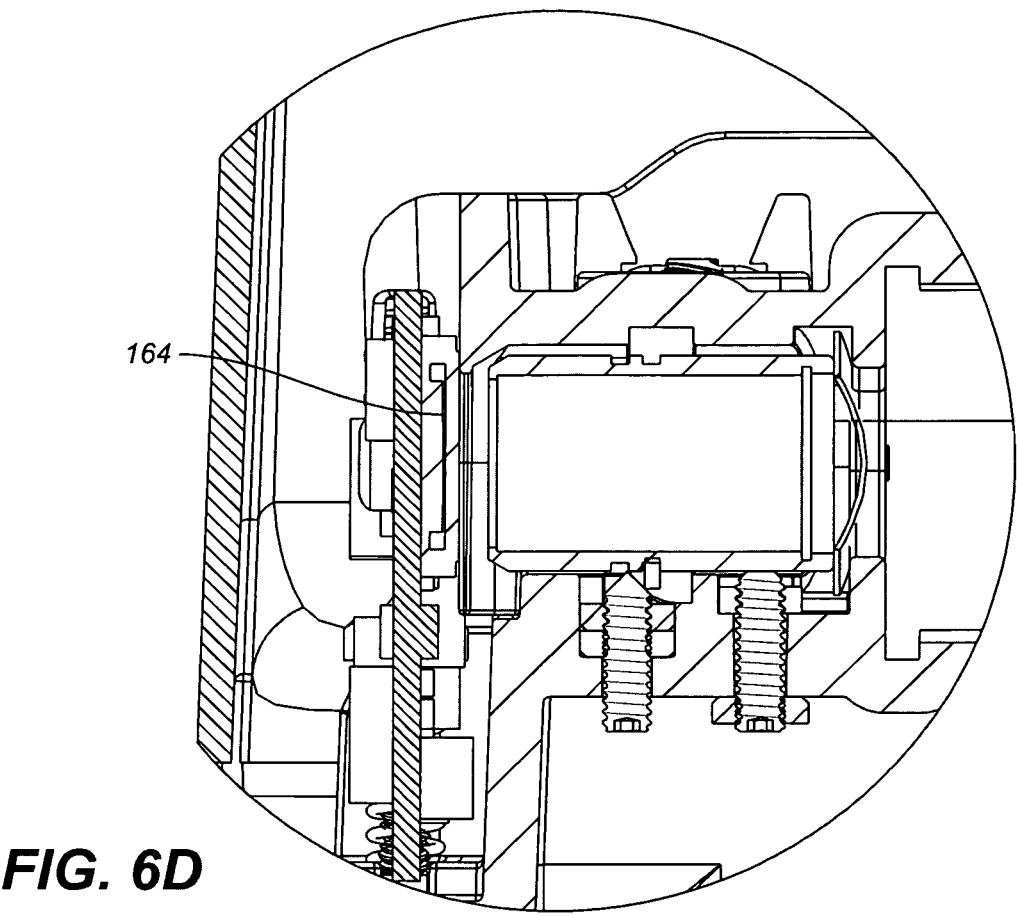
FIG. 6D is a section of area F of FIG. 6C.
Figure 7:
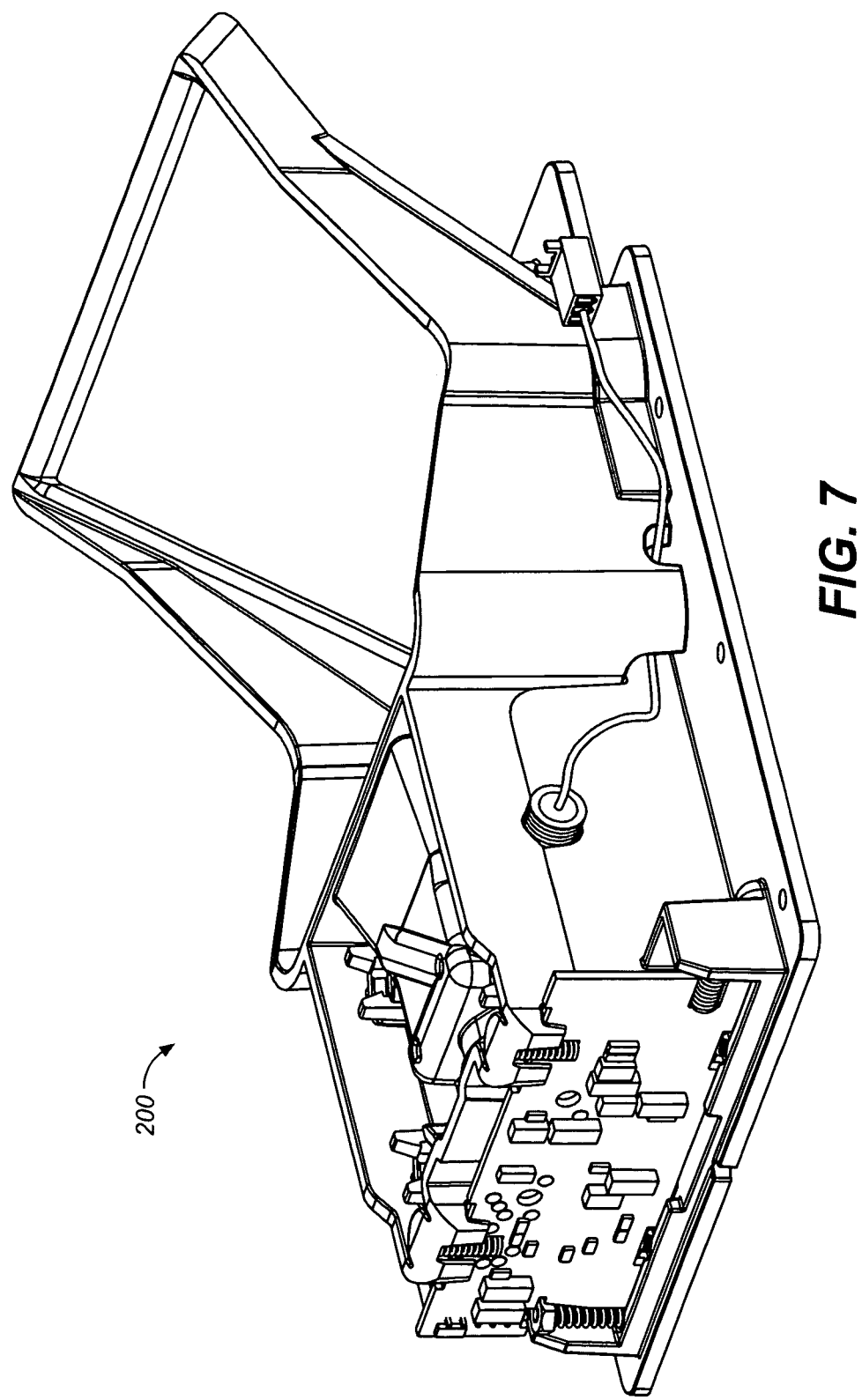
FIGS. 7-11 are different views of the optics module assembly and components of reader 100.
Figure 8:
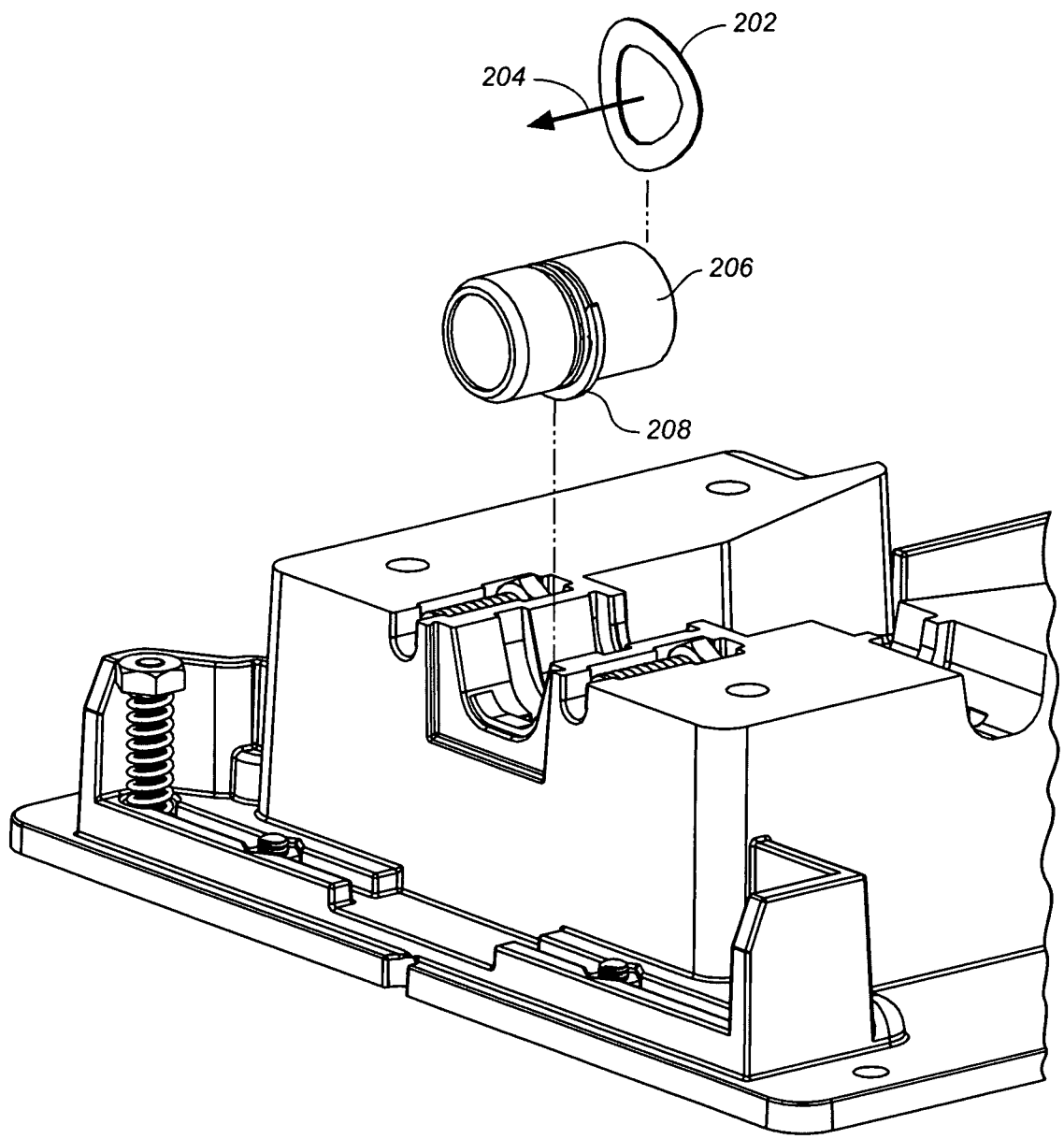
Figure 9:
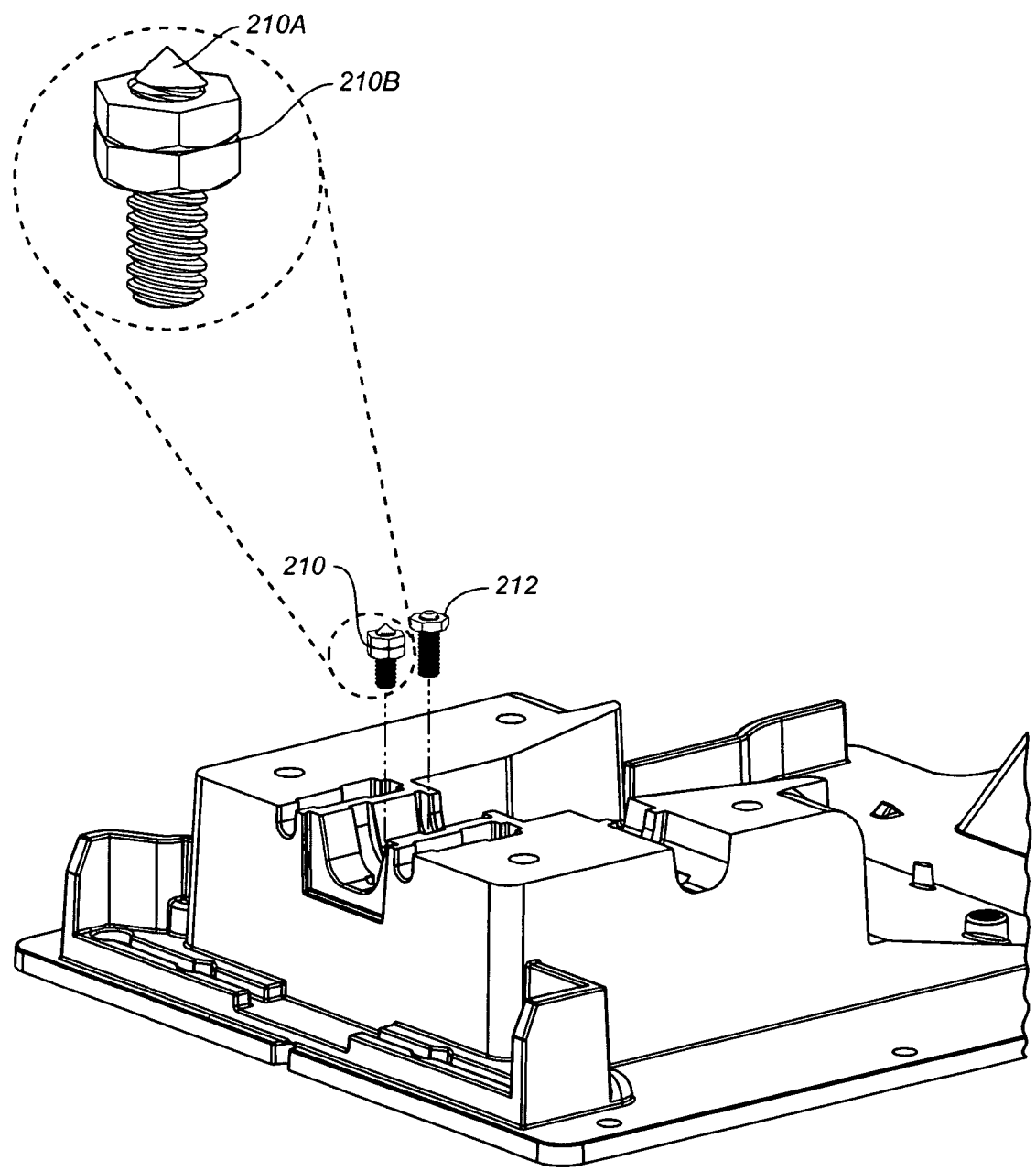

FIG. 6A is a section of reader 100, and FIG. 6B is a section of area E shown in FIG. 6A. Infrared transmitter 162 is used to illuminate material to be read, which is reflected from the material and captured by image capture sensor 164. FIG. 6C is another section of reader 100 and FIG. 6D is a section of area F of FIG. 6C.

Initial document detection sequences take advantage of the flexibility and high degree of information content by sampling data from the digital image capture sensor 164. Using image capture sensor 164 for identifying the presence of a document not only initiates the capture process but information gathered with regard to document shape, position and orientation, is also passed to the processor to optimize system performance.

One disadvantage with imaging based documentation schemas is their susceptibility to false events induced by extraneous image related events, such as light shadows induced by a passerby or environmental lighting changes. To distinguish between whether a document is present and these extraneous events reader 100 uses a unique process of lighting variation detection followed by image based analysis for document structure characteristics.

Lighting variation detection is accomplished by monitoring a parameter within the imaging device which surveys the average brightness as witnessed by the sensor. To combat issues related to ambient light and environmental conditions, reader 100 preferably employs the use of infrared lighting. Use of infrared lighting additionally limits the nuisance to the operator in having white light emitting towards them while the system is waiting for document scanning.

Document structure analysis is performed whereby normal document traits, such as orthogonal edges, bright field content, and orthogonally oriented content composition are recognized.

As some documents can potentially go undetected using the imaging based analysis, a design has been created whereby this method is further supplemented by use of infrared receiver 160, which in a preferred embodiment comprises one or more photodiodes. Receiver 160 is arranged such that exposure to the infrared lighting will be detected by the photodiode, and in one preferred embodiment saturates the photodiode junction. The photodiode is modulated to supply a binary signal to a detection algorithm via microprocessor control. As an object is passed by the photodiode, the transmission of infrared energy is obstructed thereby prohibiting reception and/or saturation of the photodiode. As photodiodes are susceptible to failure to detect obstruction as a result of opaque light transmission through a document or direct transmission through clear edged documents, it is necessary to extend their detection capability. In this regard, reader 100 employs a unique arrangement by creating an assembly that orients the diode in a manner to favor position specific document detection in a light emission field that exposes a broad document surface. This unique orientation mechanism allows simultaneous usage of infrared lighting to illuminate to imaging target and for document detection purposes. The photodiode is aligned such that it is biased by the emitter illumination source in a position that intersects the platen about 0.75 to 1.0 inches, (preferably 0.84 inches) from the rear document stop and about 0.75 to 1.0 inches (preferably 0.82 inches) in height above the platen at an angle of about 30-40 (preferably 35) degrees.

Optics Module

In the case of passport reader technology, the marketplace demands an increasing level of sophistication in the implementation of image resolution. Specifically, the market desire for increasing image pixel density to identify and recognize greater detail in document issuance traits is driven by the availability of camera image sensor availability. While inclusion of higher density camera devices is readily achievable by manufacturers, the incorporation of such devices in order to yield optimal optical performance is not. Inclusion of higher density cameras without incorporation of techniques to optimize optical properties is analogous to a human with poor optometry viewing the world through improperly prescribed eyeglasses. While the human vision engine (the eye) is capable of forming high information content image collection (high pixel density), the poor prescription prevents the crispness of image in being transferred to the retina. The result is an out of focus image. Employment of high density camera technology into passport readers must consider this optics implementation with the same regard. Without properly prescribed prescription and optical properties, the advancements in camera technology will not be realized.

Criticality in design of the passport reader optical system is in direct contention with the need to simplify design and employ low cost manufacturing techniques. Specifically, alignment of a highly complex optical design requires tightness of tolerance not normally achieved with such manufacturing techniques Reader 100 employs the use of injection molded bodies that incorporate integrated alignment mechanisms. It also includes part marriage component design that engages body to body reference as to not require manufacturing assembly attentiveness. Spring loaded floating component techniques ensure the direct mating of the camera sensor to ensure orthogonal placement with regard to optical lens alignment. Mounting consideration of the optical lens enables a post assembly focus adjustment unlike the prior art. Further, the camera alignment for lateral position and skew is facilitated by the floating spring design in conjunction with camera circuit board features to also allow unique post assembly alignment during the manufacturing process. Optics module assembly 200 is illustrated in FIGS. 7-11.

With any optical lens, it is required to position the lens between the object of attention and the image that is formed at a target location. In the present case, this position is between the document and the digital camera sensor. If the lens is not positioned for optimal optical conditions, the system will not achieve its intended image resolution prescription.

To achieve this capability, reader lens 206 incorporates a simple barrel design. Grooves or slots are incorporated in the barrel design for the mounting of a C-style compression ring 208. This ring is used in conjunction with an orthogonally arranged wedge driving screw (focus screw 210 (FIG. 9)) to transfer directional force of the screw in a directional force 204 along the lens axis. When mounted in its housing, the lens is engaged with a curved spring disk 202 which acts to impose an opposing force along the lens axis to the prior mentioned compression ring arrangement. Thus, as the focus screw is adjusted, the lens position is altered in a direction orthogonal to the focus screw on axis with the camera sensor. This motion and orientation defines the optical axis and provides a means for positioning the lens for optimal focus.

The arrangement of lens design, compression ring, focus screw, lens body mount, and curved spring disk 202 utilizes inexpensive commonly available components to achieve extremely precise lens focus action. In any sort of lens camera arrangement, it is more common to employ lens mount devices, such as threaded sleeves or gear driven mechanisms to achieve lens positioning, which have significantly higher fabrication costs, and are therefore less desirable.

The focus screw 210 is further equipped with a dual nut retention feature 210B. A single nut is required to provide a thread for the screw action whereas the second nut provides extended screw alignment to ensure precise positioning with regard to the compression ring where the screw is housed in the injection molded housing. This technique is a detail that ensures success in achieving precision using economical components. The focus screw 210 is paired with an accompanying retention screw 212 to hold the lens in place in its final optical position.

Proper high accuracy reader operation requires a precise orthogonal arrangement of the digital camera device and the lens. In the prior design of reading devices, such an arrangement is achieved through precisely controlled machined components. A more economically viable solution using injection molded plastic components means that such precision is not by default afforded. Embodiments of reader 100 incorporate injection molded body design that employ orthogonal reference planes for the lens and camera sensor. The challenge in achieving this relationship balances the limited availability of material in an interlocking design where structural support of adjoining members accommodates weaker substructures.

Figure 10:
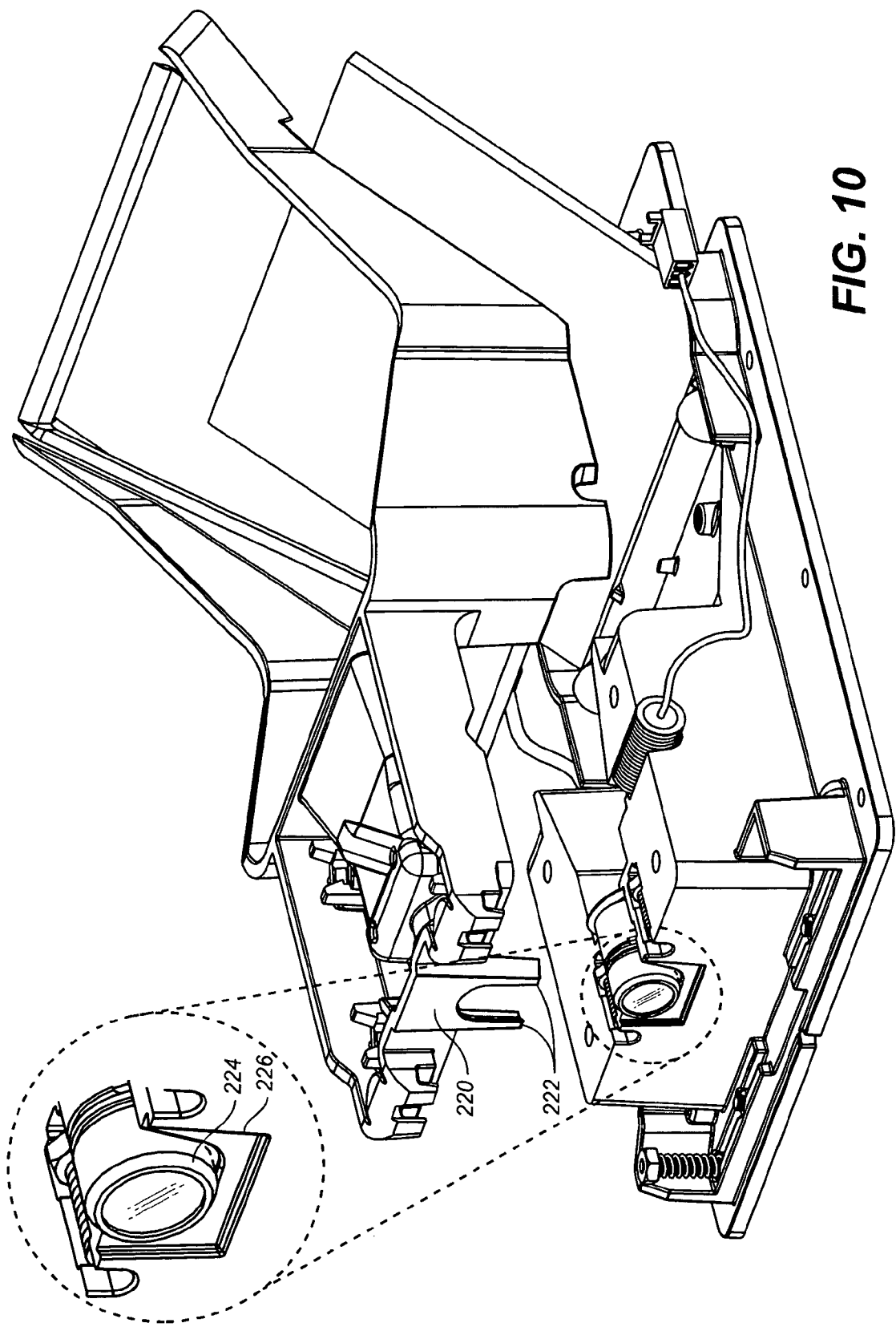
Figure 11:
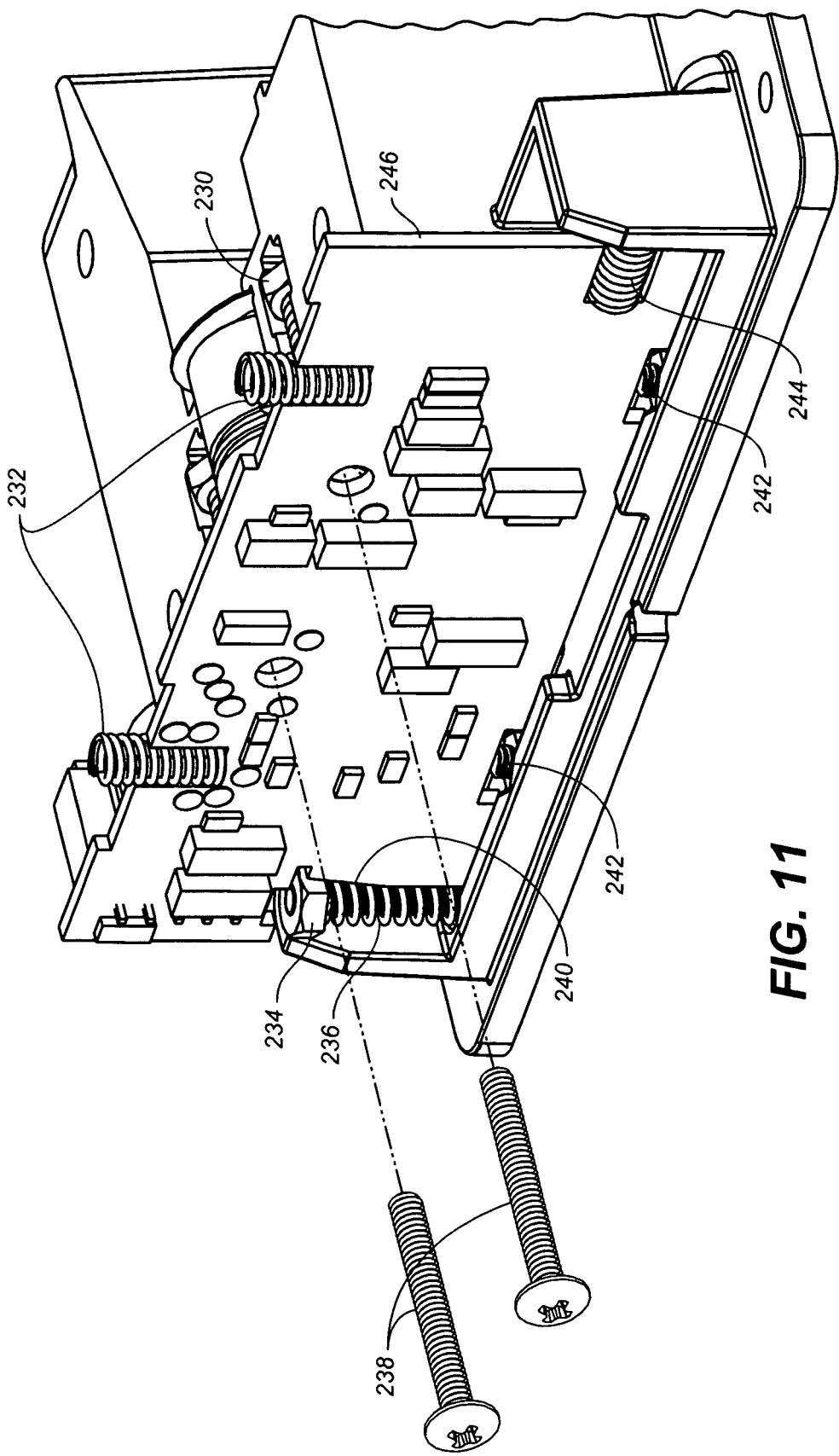

The principle feature that establishes the orthogonal relationship of the lens and sensor are the protrusions 222 (FIG. 10) that extend downward from the upper optical lens mount body (FIG. 10). By establishing the upper body as the base of optic alignment, no alignment attentiveness is required during manufacture assembly between the upper and lower assembly cavities (FIG. 10). Protrusions 222 are inserted between the limited gap allowed between the lens and camera sensor device in order to comply with optical design requirements; optical design requires tight placement between the lens and the digital image sensor device. As injection molded components require a tapering in their structure, establishing a solution using thin wall design is limited by the tapering of these structural walls. Thin walls are extremely susceptible to deformation during the molding process where unformed molting plastic is cured to define a rigid body part. In this process, parts are removed from the mold while warm and still malleable. The malleability induces deformation of parts as a result of the inability to keep parts in a fixed location as they cool and become rigid. As the basis of orthogonal alignment, the protrusion design is challenged by these characteristics in the molding process.

In reader 100, the thin walled protrusions 222 are engaged in the lower assembly cavity. Using the characteristic of continued malleability of the thin walled components, a method was devised to use the lower cavity to reform the protrusions into proper position by the marriage of the upper and lower cavities. This engagement establishes an alignment of the two bodies while simultaneously supporting the thinner weak protrusion construction by the larger thick walled lower structure. The lens barrel design includes a chamfer 224 in order to provide adequate material to support the protrusion engagement interface 226

It is desirable to align the camera image sensor to the optical axis in order to achieve alignment between the captured image and the intended viewing target. These adjustments accommodate standard errors common in the fabrication of the image sensor and errors during assembly of the image sensor to its controlling circuitry. Fine positioning sensitivity is required with horizontal, vertical, and rotational position of the sensor along the plane of the sensor to lens interface. Once adjusted, it is critical to hold this position for the life of the product. So, while the sensor must allow for adjustment in position, its placement must be locked into its final position. Achieving a design that allows this capability after completion of the assembly process introduces significant economical advantage as a result of reduced material handling and sequential assembly interruptions.

Reader 100 achieves this with an arrangement of spring loaded retention screws (described below) to both hold the camera in its final position while simultaneously allowing positional adjustment.

Engagement of the digital image sensor 164 face with the lens plane is ensured by directional force applied by the sensor plane retention screws 238. These screws engage with mating nuts that are retained within the injection molded body. Precision compression springs 230 are captured by the screw and nut in an arrangement that imposes force on the sensor against the lens sensor plane. This force ensures mating of the sensor to the lens sensor plane while simultaneously allowing the sensor to move along this surface.

Positioning the sensor along the lens sensor plane occurs through an arrangement of three adjustment screws: two screws 242 for vertical and skew adjustment, one screw 236 for horizontal adjustment. The springs use a similar arrangement using precision compression springs to induce opposing forces to the adjustment screw. This force not only ensures engagement with the screw but imposes sufficient force to hold the camera in its final location throughout the life of the product. This arrangement of readily available inexpensive components continues to support the economic advantages in this assembly process while yielding specification tolerance control not normally achieved with low cost injection mold design.

The action of the vertical and skew adjustment screws 242 is achieved by an arrangement of two screws along the bottom of the camera sensor circuit board 246. The opposing force for these adjusting screws is applied by precision compression springs 232 on the adjacent side of the circuit board. Skew correction is achieved by adjusting the screws 242 in opposing directions. The upward force on one screw in conjunction with the downward force on the second screw induces a rotational orientation change. Vertical position correction is achieved by adjusting these screws in the same direction. The horizontal position action is created by an arrangement of an adjustment screw 236 in a similarly arranged configuration that captures a precision compression spring which imposes force on the capturing nut. The nut 234 is arranged whereby adjustment of the screw induces an upward/downward motion on the nut. The nut due to its arrangement with the camera circuit board, which employs a wedge shape design mating with the nut, induces a horizontal translation of the circuit board by the vertical translation of the nut. An opposing spring 244 is designed to ensure suitable force to oppose the direction of the nut/wedge translation.

While embodiments have been described above, it should be understood that the present invention should not be limited by the disclosed embodiments, but entitled to the full scope recited in the appended Claims.

What is claimed is:

1. An identification reader, comprising:
   a body comprising a digital image capture mechanism and a platen;
   a fixed positioning device atop the body;
   the fixed positioning device having an outer surface and an inner surface and an opening for receiving a passport or other identification, wherein the fixed positioning device covers a majority of an area of the platen but a side of the fixed positioning device where the opening is located comprises a notch of sufficient depth to allow an operator's hand to touch the platen;
   a plurality of brushes affixed to the inner surface and extending down towards the platen; and
   the plurality of the brushes operable to hold a page of the passport or the other identification against the platen such that the operator of the identification reader need use only one hand to place the passport or the other identification within the opening, have the passport or the other identification read, and remove the passport or the other identification.

2. The identification reader of claim 1, wherein the platen comprises a clear plate located within a cutout within an upper surface of the body, an upper surface of the clear plate below or at substantially the same level as the upper surface of the body.

3. The identification reader of claim 2, comprising a front side and a back side, and wherein an insertion path runs from the front side to the back side and passes through the opening for receiving the passport or the other identification within the fixed positioning device.

4. The identification reader of claim 3, further comprising a document insertion deflection structure within the insertion path.

5. The identification reader of claim 4, wherein the document insertion deflection structure comprises an arcuate surface.

6. The identification reader of claim 5, wherein the arcuate surface is an integral part of the body.

7. The identification reader of claim 1, wherein the plurality of brushes comprises a central brush aligned parallel to an insertion direction of the passport or the other identificaiton.

8. The identification reader of claim 7, wherein bristles of the central brush are substantially perpendicular to a face of the platen.

9. The identification reader of claim 1, wherein the plurality of brushes comprises one or more peripheral brushes, said peripheral brushes aligned at an angle of about 24 to 26 degrees from vertical.

10. The identification reader of claim 1, wherein the plurality of brushes comprise at least one brush operable to be displaced a distance equal to at least three times the thickness of an open passport or the other identification.

11. The identification reader of claim 1, wherein a distance between the platen and an end of a brush is in the range of 0.007 to 0.011 inches.

12. The identification reader of claim 1, wherein the distance from an upper surface of the platen and the inner surface of the fixed positioning device is approximately 0.7-1.2 inches, thereby accommodating fingers of the operator within the opening.

13. The identification reader of claim 3, wherein at a junction between the upper surface of the body and the clear plate, the upper surface of the body comprises a radiused edge that prevents the edge of an identification card from catching and interrupting removal of the card, if in the event the identification reader is utilized to read an identification card.

14. An identification reader, comprising:
   a body comprising a digital image capture mechanism and a platen;
   a fixed positioning device atop the body;
   the fixed position device having an outer surface and an inner surface and an opening for receiving a passport or other identification;
   a plurality of brushes affixed to the inner surface and extending down towards the platen wherein the plurality of brushes includes a central brush aligned parallel to an insertion direction of the passport or the other identification and one or more peripheral brushes aligned at an angle of about 24 to 26 degrees from vertical; and
   the plurality of the brushes operable to hold a page of the passport or the identification against the platen such that an operator of the identification reader need use only one hand to place the passport or the other identification within the opening, have the passport or the other identification read, and remove the passport or the other identification.

* * * * *